United States Patent [19]

(12) United States Patent
Lee et al.

(10) Patent No.: US 7,567,333 B2
(45) Date of Patent: Jul. 28, 2009

(54) LIQUID CRYSTAL DISPLAY DEVICE AND METHOD OF FABRICATING THE SAME

(75) Inventors: Chang-Hoon Lee, Gyeongsangbuk-do (KR); Il-Man Choi, Dae-gu (KR)

(73) Assignee: LG Display Co., Ltd., Seoul (KR)

( * ) Notice: Subject to any disclaimer, the term of this patent is extended or adjusted under 35 U.S.C. 154(b) by 209 days.

(21) Appl. No.: 11/652,686

(22) Filed: Jan. 12, 2007

(65) Prior Publication Data

US 2007/0115422 A1 May 24, 2007

Related U.S. Application Data

(62) Division of application No. 10/872,541, filed on Jun. 22, 2004, now Pat. No. 7,184,118.

(30) Foreign Application Priority Data

Jun. 27, 2003 (KR) ............................ 2003-0042729

(51) Int. Cl.
*G02F 1/1333* (2006.01)
*G02F 1/1335* (2006.01)
*G02F 1/13* (2006.01)

(52) U.S. Cl. ..................... 349/156; 349/106; 349/110; 349/187; 430/7

(58) Field of Classification Search .................. 349/106, 349/110, 156, 187
See application file for complete search history.

(56) References Cited

U.S. PATENT DOCUMENTS

| 6,287,733 B1 * | 9/2001 | Miyazaki et al. ............... 430/7 |
| 6,414,733 B1 * | 7/2002 | Ishikawa et al. ............ 349/110 |
| 6,794,216 B2 * | 9/2004 | Ko ............................... 438/72 |
| 2001/0026347 A1 * | 10/2001 | Sawasaki et al. ............ 349/156 |
| 2003/0103185 A1 * | 6/2003 | Kim et al. .................... 349/156 |
| 2003/0111098 A1 * | 6/2003 | Kim ............................ 134/26 |
| 2004/0125324 A1 * | 7/2004 | Kim et al. .................... 349/187 |

FOREIGN PATENT DOCUMENTS

| CN | 1423155 A | 6/2003 |
| JP | 2001-166310 | 6/2001 |
| JP | 2001-183510 | 7/2001 |
| JP | 2001183510 A * | 7/2001 |
| JP | 2001-305552 | 10/2001 |
| JP | 2002-287155 | 10/2002 |
| JP | 2002-350857 | 12/2002 |
| JP | 2002-350867 | 12/2002 |

* cited by examiner

*Primary Examiner*—Julie Ngo
(74) *Attorney, Agent, or Firm*—McKenna Long & Aldridge LLP (57) ABSTRACT

A color filter substrate for a liquid crystal display device includes a substrate having a plurality of pixel regions, a black matrix array having a lattice configuration on the substrate, the black matrix array corresponding to boundary regions between adjacent ones of the pixel regions, a plurality of color filter layers, each corresponding to one of the pixel regions, and a column spacer array having a lattice configuration, the column spacer array corresponding to the black matrix array.

8 Claims, 7 Drawing Sheets

LIQUID CRYSTAL DISPLAY DEVICE AND METHOD OF FABRICATING THE SAME

This application is a divisional of prior U.S. application Ser. No. 10/872,541, filed Jun. 22, 2004 now U.S. Pat. No. 7,184,118.

The present invention claims the benefit of Korean Patent Application No. 2003-0042729 filed in Korea on Jun. 27, 2003, which is hereby incorporated by reference.

BACKGROUND OF THE INVENTION

1. Field of the Invention

The present invention relates to a display device and a method of fabricating a display device, and more particularly, to a liquid crystal display (LCD) device and a method of fabricating an LCD device.

2. Discussion of the Related Art

In general, an LCD device includes two substrates that are spaced apart and facing each other, wherein a liquid crystal layer is interposed between the two substrates. Each of the substrates includes an electrode, wherein the electrodes of each substrate also face each other. Accordingly, when a voltage is supplied to each of the electrodes, an electric field is induced to the liquid crystal layer between the electrodes. Thus, alignment of liquid crystal molecules of the liquid crystal layer are changed by varying the intensity or direction of the electric field, thereby varying light transmissivity of the liquid crystal layer and displaying an image.

Figure 1:
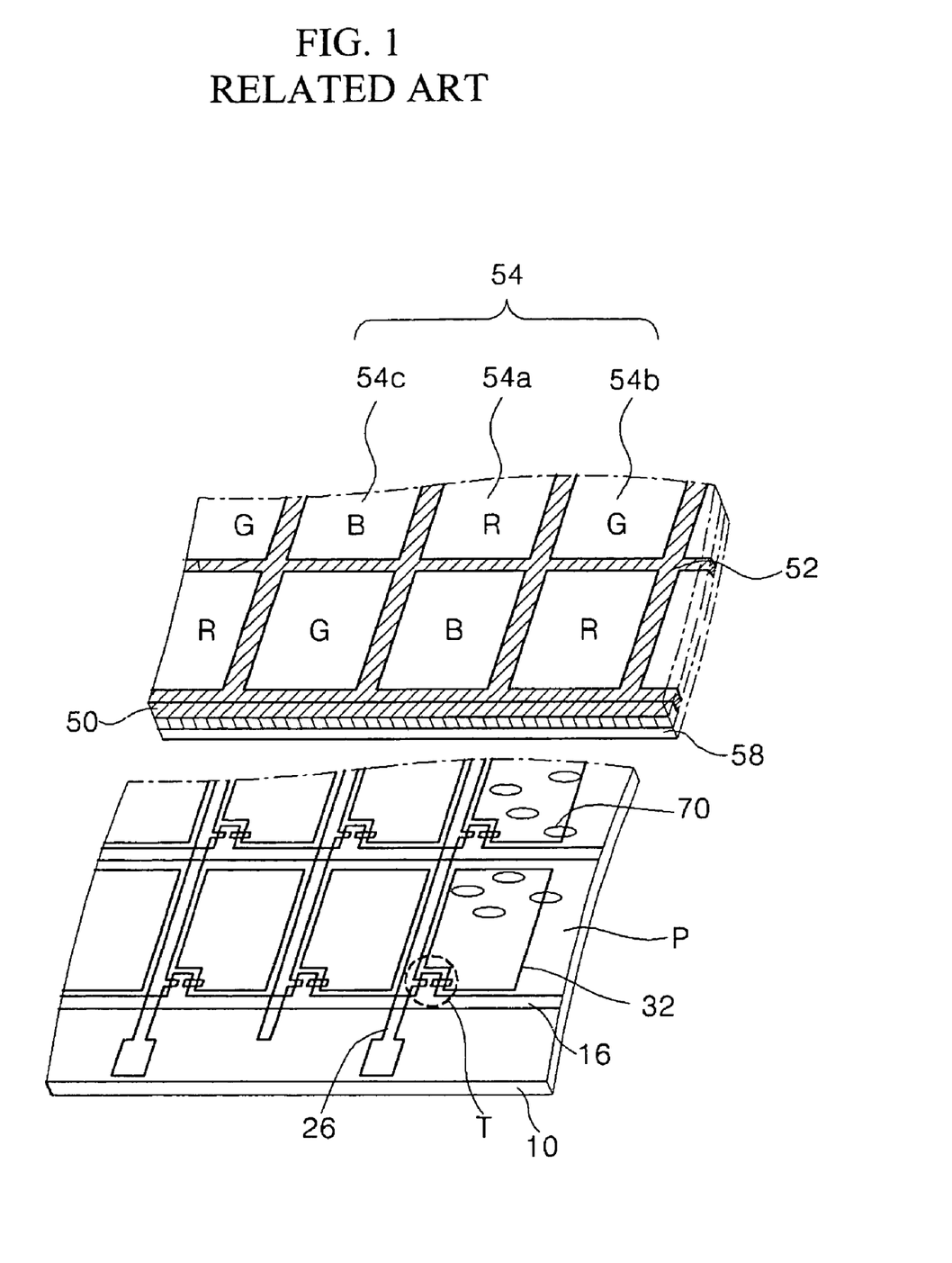
FIG. 1 is a perspective view of an LCD device according to the related art.

FIG. 1 is a perspective view of an LCD device according to the related art. In FIG. 1, an LCD device has upper and lower substrates 50 and 10 that are spaced apart from and facing each other, and a liquid crystal layer 70 is interposed between the upper substrate 50 and the lower substrate 10. The upper substrate 50 may commonly be referred to as a color filter substrate, and the lower substrate 10 may be commonly referred to as a TFT array substrate.

The upper substrate 50 includes a black matrix 52, a color filter layer 54, and a common electrode 58 disposed along an interior surface (i.e., side facing the lower substrate 10) of the upper substrate 50. The color filter layer 54 corresponds to openings formed within the black matrix 52, and includes three sub-color filters of red (R) 54a, green (G) 54b, and blue (B) 54c. In addition, the common electrode 58 is formed on the color filter layer 54 and is formed of a transparent material.

In FIG. 1, at least one gate line 16 and at least one data line 26 are formed on an interior surface (i.e., side facing the upper substrate 50) of the lower substrate 10, wherein the gate line 16 and the date line 26 cross each other to define a pixel region P. A switching element, such as a thin film transistor (TFT) T, is formed at the crossing point of the gate line 16 and the data line 26, wherein the TFT T includes a gate electrode, a source electrode, and a drain electrode. A plurality of the TFTs is arranged in a matrix configuration to correspond to other crossings of gate and data lines 16 and 26. In addition, a pixel electrode 32 is formed in the pixel region P, and is connected to the TFT T. The pixel electrode 32 corresponds to the sub-color filters 54a, 54b, and 54c, and is formed of a transparent conductive material, such as indium-tin-oxide (ITO), that has a relatively high light transmissivity.

Figure 2:
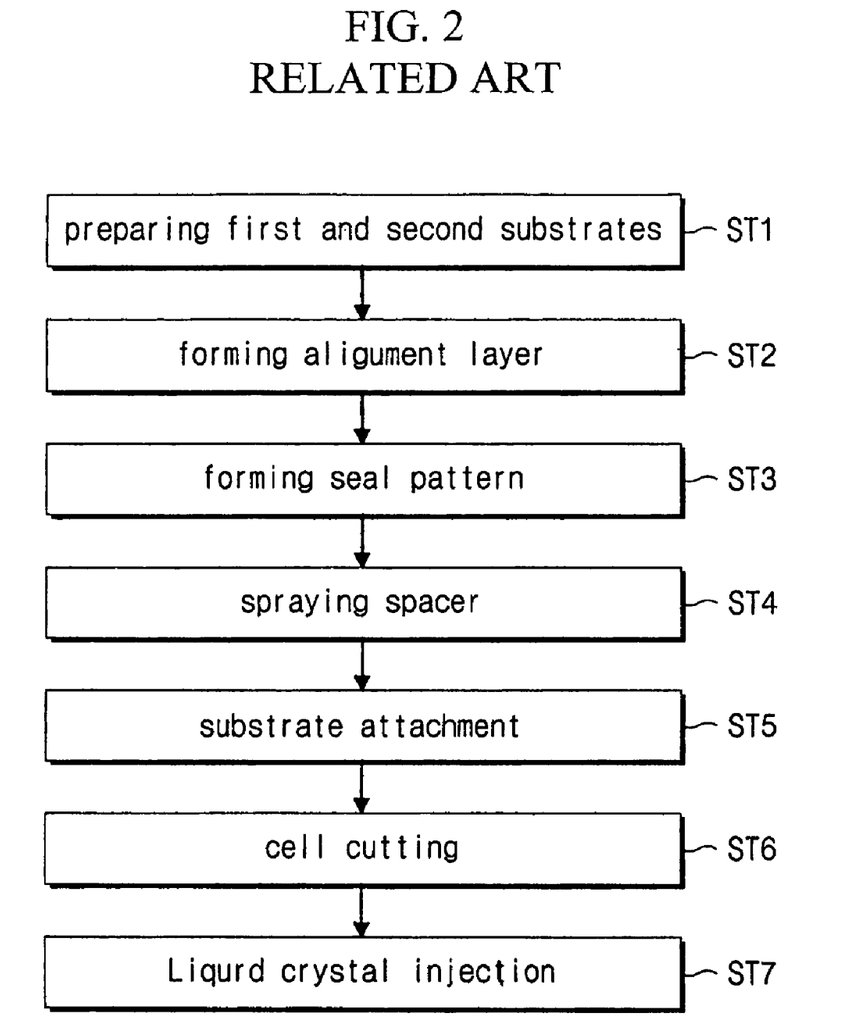
FIG. 2 is a flow chart of a fabrication process of an LCD device according to the related art.

FIG. 2 is a flow chart of a fabrication process of an LCD device according to the related art. In FIG. 2, a step ST1 includes preparation of a lower substrate having TFTs and pixel electrodes, and an upper substrate having a color filter layer and a common electrode.

Next, a step ST2 includes formation of first and second alignment layers on the pixel electrode and the common electrode, respectively. The formation of the first and second alignment layers includes coating thin polymer films, such as polyimide, on the pixel and common electrodes, and rubbing the thin polymer films. The thin polymer films must have uniform thickness, and the rubbing process must be performed uniformly along the thin polymer films. Accordingly, an initial orientation of liquid crystal molecules is determined by the rubbing process.

Then, step ST3 includes forming a seal pattern on either the lower substrate or the upper substrate, thereby providing a cell gap between the lower and upper substrates to allow for injection of liquid crystal material between the lower and upper substrates. In addition, the seal pattern prevents the injected liquid crystal material from leaking through the seal pattern. The seal pattern is commonly fabricated using a screen-printing method or a dispensing method that includes a mixture of thermosetting resin and glass fiber.

During step ST4, spacers are sprayed on one of the lower and upper substrates using a spacer spraying method to maintain a uniform gap between the lower and upper substrates. The spacer spray method can be divided into two different types, such as a wet spray method that includes spraying a mixture of alcohol and spacer material, and a dry spray method that includes spraying spacer material alone.

In FIG. 2, the seal pattern and the spacers are formed on different substrates. For example, the seal pattern may be formed on the upper substrate that has a relatively flat surface, and the spacers may be formed on the lower substrate.

During step ST5, the lower and upper substrates are aligned and are attached to each other along the seal pattern. An alignment accuracy of the substrates is determined by an alignment margin, wherein an alignment accuracy of several micrometers is required since light leakage occurs if the substrates are misaligned beyond the alignment margin.

During step ST6, the attached substrates are divided into unit cells using a cell cutting process. The cell cutting process includes a scribing process that forms scribe lines on a surface of the substrate using a diamond pen or a cutting wheel of tungsten carbide, wherein a hardness of the diamond pen or cutting wheel is higher than a hardness of the substrate, which is formed of glass. Then, a breaking process is performed to divide the unit cells by applying a force.

During step ST7, a liquid crystal material is injected between two substrates of each individual unit cells using a vacuum injection process, wherein each unit cell has an area of several square centimeters and a cell gap of several micrometers. The vacuum injection process makes use of a pressure difference between an interior of the unit cell and an exterior of the unit cell.

Then, after completing the vacuum injection process, the injection hole is sealed to prevent leakage of the liquid crystal material. In general, an ultraviolet (UV) curable resin is injected into the injection hole using a dispenser, and ultraviolet light is irradiated onto the resin to harden the resin and seal the injection hole. Next, polarization films are attached onto outer surfaces of the unit cell, and a driving circuit is connected to the unit cell using an attachment process.

During the above processes, special standardized spacers are used as the spacers. However, there are many limitations in spraying the spacers. In addition, it is difficult to obtain a uniform cell gap for large-sized substrates. Thus, patterned spacers have been developed, wherein the patterned spacers may be formed on the upper substrate (i.e., color filter substrate) and/or the lower substrate (i.e., TFT array substrate). If the patterned spacers are formed on the lower substrate, then the patterned spacers are disposed over array lines of the TFT array.

Figure 3:
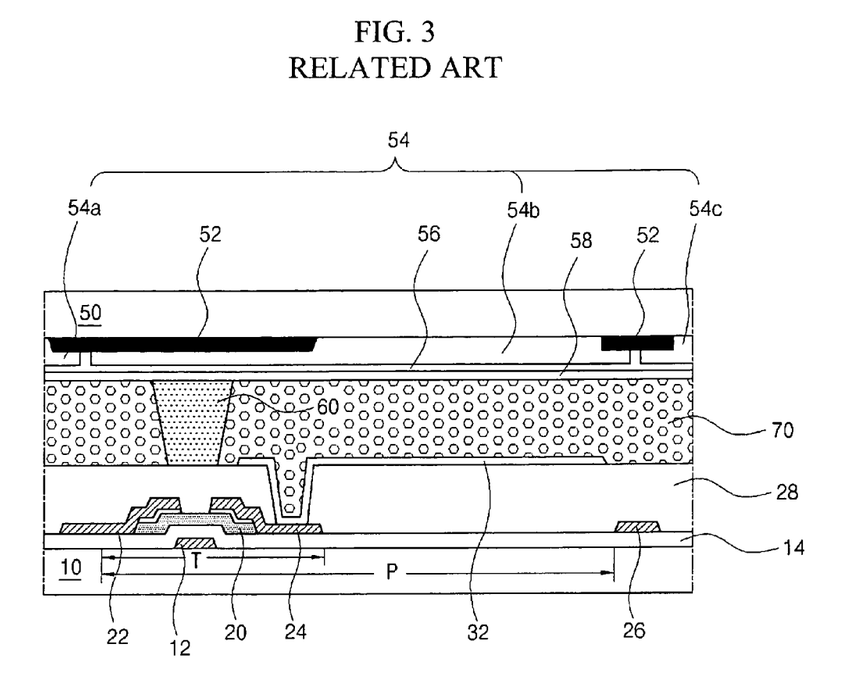
FIG. 3 is a schematic cross sectional view of an LCD device according to the related art.

FIG. 3 is a schematic cross sectional view of an LCD device according to the related art. In FIG. 3, an LCD device includes a first substrate 10, a second substrate 50, and a liquid crystal layer 70 interposed therebetween. In addition, a pixel region P is defined on the first substrate 10 by crossing a gate line 16 (in FIG. 1) and a data line 26, wherein a TFT T and a pixel electrode 32 are formed within the pixel region P. The thin film transistor T includes a gate electrode 12 that is connected to the gate line 16, a semiconductor layer 20 that is disposed over the gate electrode 12, a source electrode 22 that is connected to the data line 26, and a drain electrode 22 that is spaced apart from the source electrode 22 over the semiconductor layer 20.

The first substrate includes a first insulating layer 14 formed between the gate line 16 (in FIG. 1) and the data line 26, and a second insulating layer 28 formed between the TFT T and the pixel electrode 32. The second substrate 50 includes a black matrix 52 formed on an inner surface of the second substrate 50 facing the first substrate 10, wherein the black matrix 52 corresponds to the TFT T, and also corresponds to the gate line 16 (in FIG. 1) and the data line 26. The black matrix 52 corresponding to the gate line 16 (in FIG. 1) and the data line 26 has a size such that a space between the gate and data lines 16 and 26 and the pixel electrode 32 is sufficiently covered.

The second substrate 50 further includes a color filter layer 54 formed on the black matrix 52, wherein the color filter layer 54 includes three sub color filters of red 54a, green 54b, and blue 54c that correspond to one pixel region P. In addition, an overcoat layer 56 and a transparent common electrode 58 are sequentially formed along an entire surface of the second substrate 50 including the color filter layer 54.

In FIG. 3, a column spacer 60 is formed over the second substrate 50 corresponding to the black matrix 52 to maintain a uniform cell gap between the array substrate 10 and the color filter substrate 50. Accordingly, a liquid crystal material forming the liquid crystal layer 70 is injected into the uniform cell gap formed between the array substrate 10 and the color filter substrate 50 including the column spacer 60.

Figure 4:
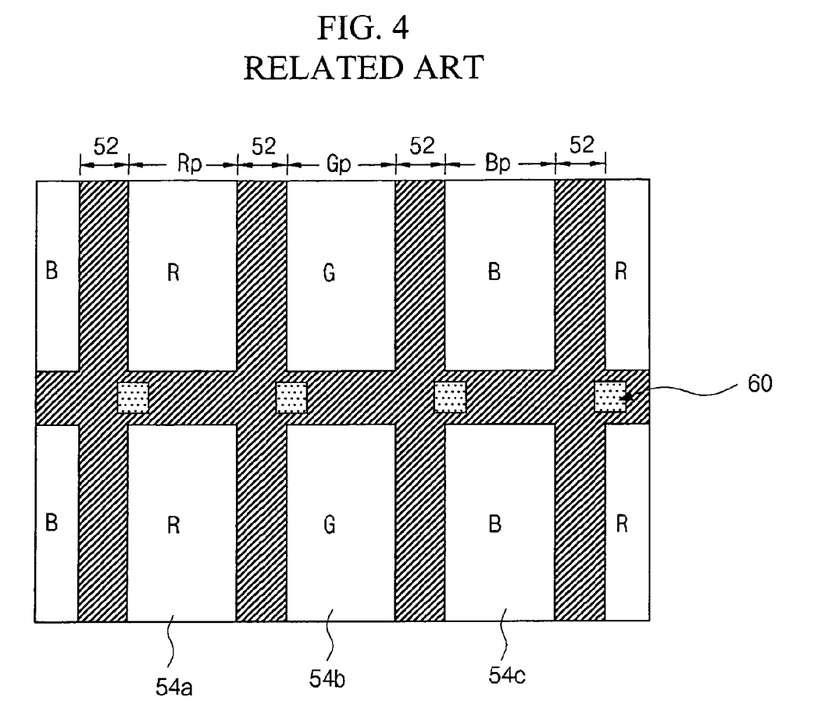
FIG. 4 is a plan view of a color filter substrate according to the related art.

FIG. 4 is a plan view of a color filter substrate according to the related art. In FIG. 4, a plurality of pixels Rp, Gp, and Bp are defined, and red, green, and blue sub color filters 54a, 54b, and 54c are formed within the pixels Rp, Gp, and Bp, respectively. Then, a black matrix 52 is disposed between the pixels Rp, Gp, and Bp, and column spacers 60 are formed to correspond to the black matrix 52.

Next, the liquid crystal material may be filled using a vacuum injection method or a drop-filling method. The vacuum injection method includes filling the liquid crystal material under a vacuum condition by dipping an injection hole into a container filled with the liquid crystal material. Accordingly, since the vacuum injection method is complicated, the liquid crystal display panel may be contaminated due to contamination of the liquid crystal material. In addition, when the injection hole is sealed and cured, the liquid crystal material may be degraded due to irradiation of UV light.

The drop-filling method includes dropping predetermined amounts of liquid crystal material onto the array substrate or the color filter substrate. For example, a plurality of TFT array substrates or color filter substrates for forming a plurality of unit cells, and the liquid crystal material is dropped onto each of the unit cells within a sealant formed around each of the unit cells. Accordingly, the drop-filling method is advantageous over the vacuum injection method. However, since it is difficulty to drop accurate amounts of the liquid crystal material, large amounts of the liquid crystal material may unnecessarily dropped onto the substrates. Thus, when the LCD panel is completed, gravity may cause excessive amounts of the liquid crystal material to flow along a gravity direction, thereby resulting in the displaying of poor quality images.

SUMMARY OF THE INVENTION

Accordingly, the present invention is directed to an LCD device and a method of fabricating an LCD device that substantially obviates one or more problems due to limitations and disadvantages of the related art.

An object of the present invention is to provide an LCD device that prevents display of poor quality images.

Another object of the present invention is to provide a method of fabricating an LCD device that prevents display of poor quality images.

Another object of the present invention is to provide an LCD device that prevents gravitational flow of liquid crystal material.

Another object of the present invention is to provide a method of fabricating an LCD device that prevents gravitational flow of liquid crystal material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a liquid crystal display device includes a substrate having a plurality of pixel regions, a black matrix array having a lattice configuration on the substrate, the black matrix array corresponding to boundary regions between adjacent ones of the pixel regions, a plurality of color filter layers, each corresponding to one of the pixel regions, and a column spacer array having a lattice configuration, the column spacer array corresponding to the black matrix array.

In another aspect, a method of fabricating a color filter substrate for a liquid crystal display device includes forming a black matrix array having a lattice configuration on a substrate, the black matrix array corresponding to boundary regions of adjacent ones of a plurality of pixel regions provided on the substrate, forming a plurality of color filter layers each corresponding to one of the pixel regions, and forming a column spacer array having a lattice configuration corresponding to the black matrix array.

In another aspect, a liquid crystal display device includes first and second substrates spaced apart from each other and having a plurality of pixel regions, gate and data lines disposed on the first substrate to cross each other, a thin film transistor at each crossing point of the gate and data lines, a pixel electrode connected to each thin film transistor, a black matrix array having a lattice configuration on the second substrate, the black matrix array corresponding to one of the gate and data lines, a color filter layer on the black matrix array and corresponding to each of the pixel regions, and a column spacer array having a lattice configuration on the color filter layer, the column spacer array corresponding to the black matrix array.

In another aspect, a method of fabricating a liquid crystal display device includes preparing first and second substrates having a plurality of pixel regions, forming gate and data lines crossing each other on the first substrate, forming a thin film transistor at each crossing point of the gate and data lines, forming a pixel electrode connected to each thin film transistor, forming a black matrix array having a lattice configuration on the second substrate, forming a color filter layer on the black matrix array, forming a column spacer array having a lattice configuration on the color filter layer, the column spacer array corresponding to the black matrix array, forming a common electrode on the second substrate, applying a liquid crystal material onto the first substrate, and attaching the first and second substrates together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
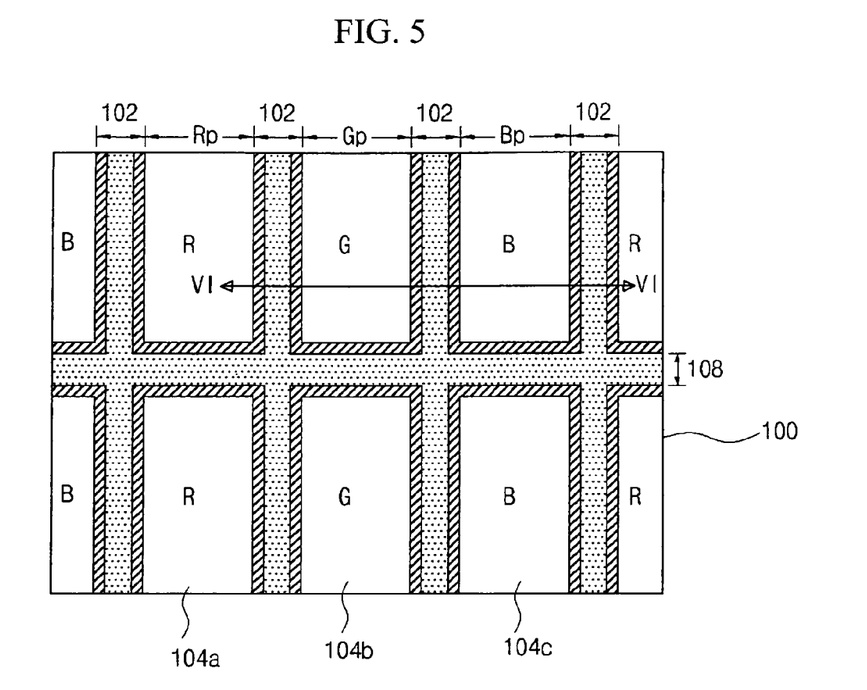
FIG. 5 is a plan view of an exemplary color filter substrate for an LCD device according to the present invention.

FIG. 5 is a plan view of an exemplary color filter substrate for an LCD device according to the present invention. In FIG. 5, a plurality of pixels Rp, Gp, and Bp may be provided on a substrate 100, and red, green, and blue sub color filters 104a, 104b, and 104c may be formed within the pixels Rp, Gp, and Bp, respectively. In addition, a black matrix array 102 may be disposed between the pixels Rp, Gp, and Bp having a lattice configuration. Moreover, a spacer 108 may be formed on the black matrix array 102, and may also have a lattice configuration similar to the lattice configuration of the black matrix array 102. The spacer 108 may prevent liquid crystal material within the LCD device from flowing along a gravity direction when the LCD device is positioned along a vertical direction parallel, or nearly parallel to the gravity direction.

Figure 6A:
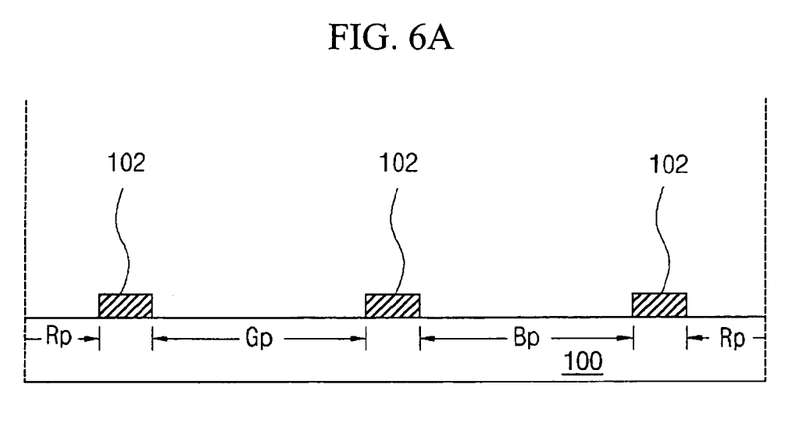
FIGS. 6A to 6C are cross sectional views along VI-VI of FIG. 5 showing an exemplary fabrication process of a color filter substrate according to the present invention.
Figure 6B:
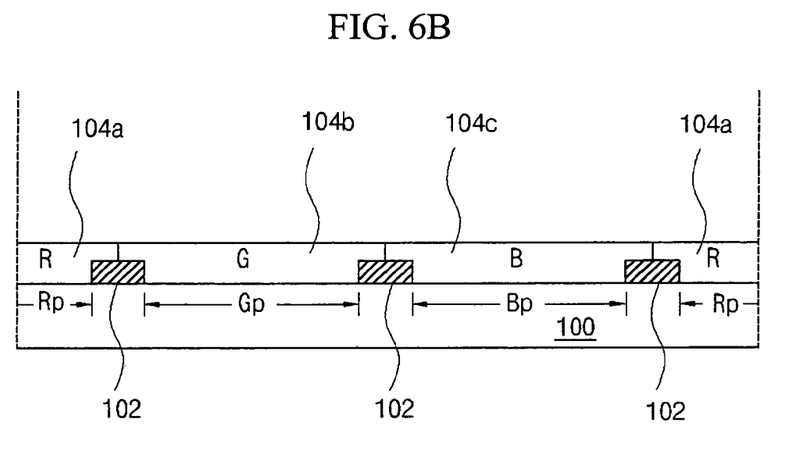
Figure 6C:
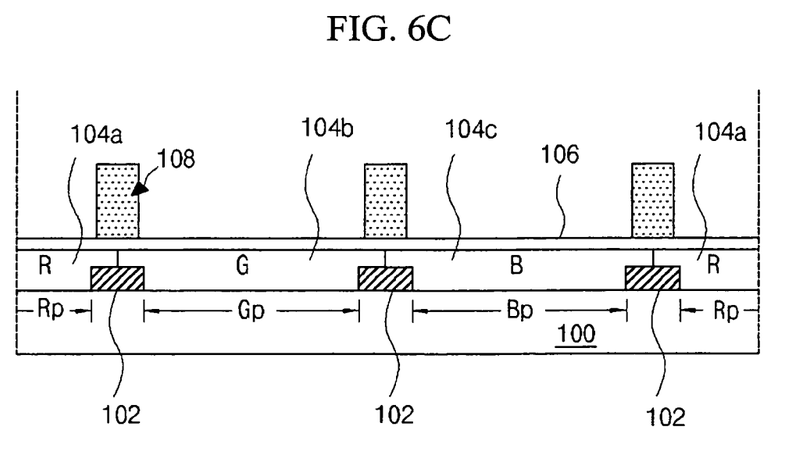

FIGS. 6A to 6C are cross sectional views along VI-VI of FIG. 5 showing an exemplary fabrication process of a color filter substrate according to the present invention. In FIG. 6A, a plurality of pixels Rp, Gp, and Bp may be provided on a transparent insulating substrate 100. Then, a photosensitive black resin may be formed on the substrate 100, and patterned to form a black matrix array 102 along boundary regions between the pixels Rp, Gp, and Bp. Accordingly, the black matrix array 102 may have a lattice configuration along a surface of the substrate 100.

In FIG. 6B, a color filter layer composed of three sub color filters 104a, 104b, and 104c may be formed on the substrate 100 including the black matrix array 102. Accordingly, the red, green, and blue sub color filters 104a, 104b, and 104c may correspond to the pixels Rp, Gp, and Bp, respectively. The color filter layer 104a, 104b, and 104c may be formed using a resin including pigments that transmit light of predetermined wavelengths from along the substrate 100. Then, the resin may be patterned to form the color filter layer 104a, 104b, and 104c.

In FIG. 6C, a common electrode 106 may be formed on the color filter layer 104a, 104b, and 104c, and may be disposed along an entire surface of the substrate 100. The common electrode 106 may be formed of a material selected from a transparent conductive material group including indium tin oxide (ITO) and indium zinc oxide (IZO).

Next, a transparent photosensitive resin may be formed on the common electrode 106, and patterned to form a column spacer array 108. The column spacer array 108 may have a lattice configuration, and may be disposed over the black matrix array 102, as shown in FIG. 5. For example, the column spacer array 108 may have a width less than a width of the black matrix array 102. In addition, the column spacer array 108 may be formed over boundary regions of the red, green, and blue sub color filters 104a, 104b, and 104c that may correspond to the pixels Rp, Gp, and Bp, respectively.

Figure 7:
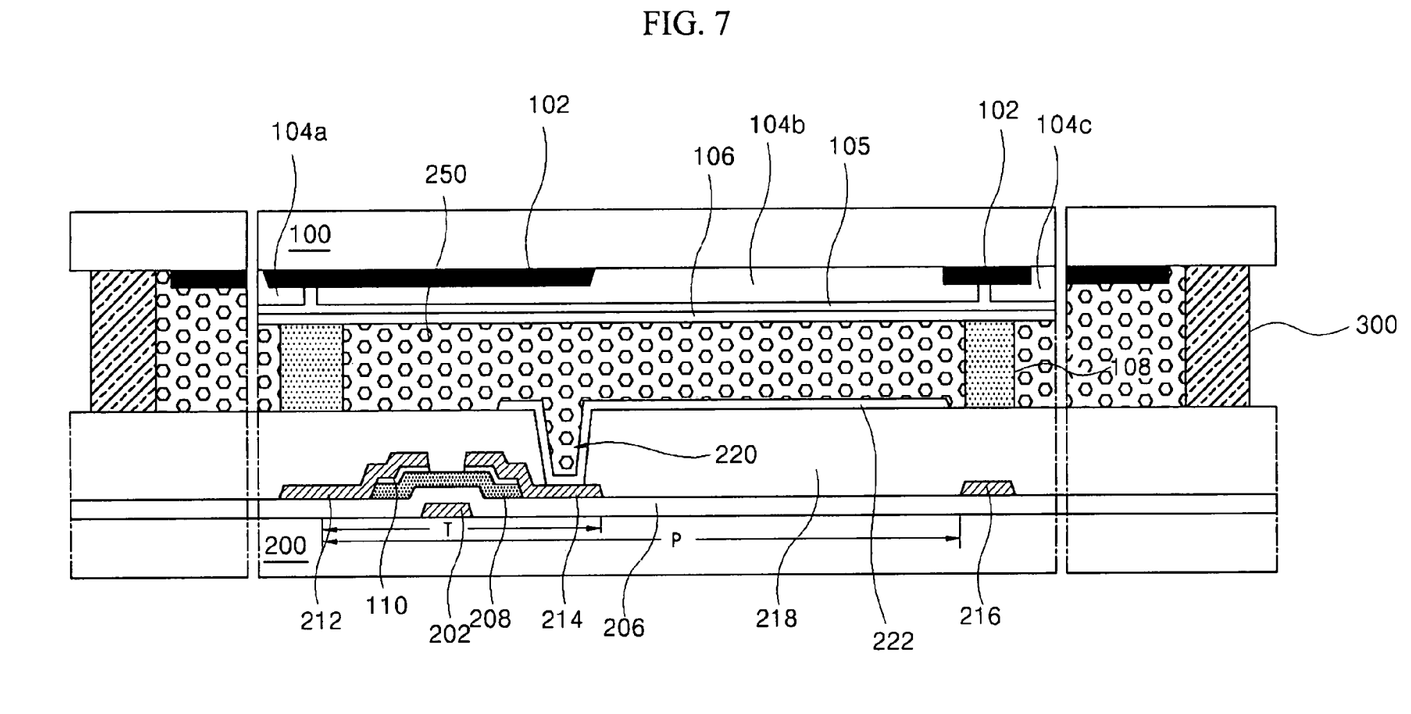
FIG. 7 is a cross sectional view of an exemplary LCD device according to the present invention.

FIG. 7 is a cross sectional view of an exemplary LCD device according to the present invention. In FIG. 7, an LCD device may include a first substrate 200, such as a TFT array substrate, a second substrate 100, such as a color filter substrate, and a liquid crystal layer 250 interposed therebetween. In addition, a TFT T may be formed corresponding to a pixel region P. The thin film transistor T may include a gate electrode 202, a semiconductor layer 208 disposed over the gate electrode 202, and source and drain electrodes 212 and 214 disposed over the semiconductor layer 208. A passivation layer 218 may cover the TFT T, and a pixel electrode 222 may be formed on the passivation layer 218 within the pixel region P. The pixel electrode 222 may be connected to the drain electrode 214 through a contact hole 220 formed in the passivation layer 218.

Although not shown, the pixel region P may be defined by a gate line and a data line 216 crossing each other with a gate insulating layer 206 therebetween. For example, the gate line may pass along a first side of the pixel region P and the gate line 216 may pass along a second side of the pixel region P.

In FIG. 7, a black matrix array 102 may be formed on an inner surface of the second substrate 100 facing the first substrate 200. The black matrix array 102 may have a lattice configuration, and may correspond to positions of the TFT T, the gate line (not shown), and the data line 216.

A color filter layer having three sub color filters of red 104a, green 104b, and blue 104c may be formed on the black matrix array 102, wherein each of the sub color filters 104a, 104b, and 104c may correspond to one pixel region P. An overcoat layer 105 may be formed along an entire surface of the second substrate 100 including the sub color filters 104a, 104b, and 104c. Accordingly, the overcoat layer 105 may flatten a surface of the second substrate 100 including the sub color filters 104a, 104b, and 104c. In addition, a transparent common electrode 106 may be formed along an entire surface of the second substrate 100 including the overcoat layer 105. As previously described above, the common electrode 106 may be formed of material selected from a transparent conductive material group including ITO and IZO. The pixel electrode 222 may be formed of the same material as the common electrode 106. Alternatively, the overcoat layer 105 may be omitted.

In FIG. 7, a column spacer array 108 may be formed on the transparent common electrode 106, wherein the column spacer array 108 may correspond to the black matrix array 102 and may have a width narrower than a width of the black matrix array 102. In addition, a sealant 300 may be formed along peripheral portions of the TFT array substrate 200.

According to the present invention, a liquid crystal layer 250 may be interposed between the first and second substrates 200 and 100. A liquid crystal material for forming the liquid crystal layer 250 may be provided on the TFT array substrate 200 using a drop-filling method after the sealant 300 has been formed. Thus, when the TFT array substrate 200 and the color filter substrate 100 are attached together, the column spacer array 108 may contact the passivation layer 218, and the sealant 300 may contact the color filter substrate 100.

Accordingly, after providing the liquid crystal material, the TFT array substrate 200 and the color filter substrate 100 may be attached together. Then, the liquid crystal material of the liquid crystal layer 250 may be uniformly diffused within an LCD panel of the LCD device.

According to the present invention, the column spacer array 108 may have a lattice configuration to enclose each of a plurality of pixel regions P. Thus, the liquid crystal material of the liquid crystal layer 250 may remain within the pixel regions, and may be prevented from flowing along a gravity direction. In addition, the column spacer array according to the present invention may be used in an In-Plane Switching (IPS) mode LCD device, wherein the pixel electrode and the common electrode may be formed on the same substrate.

According to the present invention, although excessive amounts of the liquid crystal material may be filled using the drop-filling method, the liquid crystal material may be prevented from flowing along a gravity direction by use of the column spacer array. Thus, a process margin for attaching the TFT array substrate and the color filter substrate may be increased since a quantity of the liquid crystal material may have an increased error range, thereby improving image quality.

It will be apparent to those skilled in the art that various modifications and variations can be made in the liquid crystal display device and method of fabricating an LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates spaced apart from each other and having a plurality of pixel regions;
   gate and data lines disposed on the first substrate to cross each other;
   a thin film transistor at each crossing point of the gate and data lines;
   a pixel electrode connected to each thin film transistor;
   a black matrix array having a lattice configuration on the second substrate, the black matrix array corresponding to one of the gate and data lines;
   a color filter layer on the black matrix array and corresponding to each of the pixel regions; and
   a column spacer array having a lattice configuration on the color filter layer, the column spacer array corresponding to the black matrix array.

2. The device according to claim 1, wherein the column spacer array has width portions narrower than width portions of the black matrix array.

3. The device according to claim 1, further comprising a common electrode on the second substrate.

4. A method of fabricating a liquid crystal display device, comprising:
   preparing first and second substrates having a plurality of pixel regions;
   forming gate and data lines crossing each other on the first substrate;
   forming a thin film transistor at each crossing point of the gate and data lines;
   forming a pixel electrode connected to each thin film transistor;
   forming a black matrix array having a lattice configuration on the second substrate;
   forming a color filter layer on the black matrix array;
   forming a column spacer array having a lattice configuration on the color filter layer, the column spacer array corresponding to the black matrix array;
   applying a liquid crystal material onto the first substrate; and
   attaching the first and second substrates together.

5. The method according to claim 4, wherein the column spacer array has width portions narrower than width portions of the black matrix.

6. The method according to claim 4, wherein the black matrix array corresponds to one of the gate and data lines.

7. The method according to claim 4, wherein the color filter layer corresponds to the pixel regions.

8. The method according to claim 4, further comprising forming a common electrode on the second substrate.

* * * * *